United States Patent
Dey et al.

(10) Patent No.: US 10,390,102 B2
(45) Date of Patent: Aug. 20, 2019

(54) SYSTEM AND METHOD FOR SELECTING COMMERCIAL ADVERTISEMENTS

(71) Applicant: International Business Machines Corporation, Armonk, NY (US)

(72) Inventors: Kuntal Dey, New Delhi (IN); Enara C. Vijil, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 14/918,944

(22) Filed: Oct. 21, 2015

(65) Prior Publication Data

US 2017/0118515 A1    Apr. 27, 2017

(51) Int. Cl.
| | |
|---|---|
| *H04N 21/81* | (2011.01) |
| *H04N 21/84* | (2011.01) |
| *H04N 21/4415* | (2011.01) |
| *H04N 21/258* | (2011.01) |

(52) U.S. Cl.
CPC ..... *H04N 21/812* (2013.01); *H04N 21/25866* (2013.01); *H04N 21/4415* (2013.01); *H04N 21/84* (2013.01)

(58) Field of Classification Search
CPC .......................................... G06Q 30/242–277
See application file for complete search history.

(56) References Cited

U.S. PATENT DOCUMENTS

| | | |
|---|---|---|
| 5,155,591 A | 10/1992 | Wachob |
| 9,460,451 B2 * | 10/2016 | Ruiz ............... G06Q 30/00 |
| 2002/0129362 A1 | 9/2002 | Chang et al. |
| 2006/0212897 A1 * | 9/2006 | Li ..................... H04H 60/58 725/32 |
| 2008/0004954 A1 | 1/2008 | Horvitz |

(Continued)

FOREIGN PATENT DOCUMENTS

| | | |
|---|---|---|
| EP | 1806693 A1 | 11/2007 |
| WO | 2009024874 A2 | 2/2009 |

OTHER PUBLICATIONS

Velusamy et al. "An Efficient Ad Recommendation System for TV Programs." Multimedia Systems 14, No. 2 (2008): pp. 73-87.

(Continued)

*Primary Examiner* — Nathan J Flynn
*Assistant Examiner* — Christen A Kurien
(74) *Attorney, Agent, or Firm* — Nicole A. Spence

(57) ABSTRACT

A method for personalizing video commercials displayed on a user device is provided. The method includes determining an identification of one or more users viewing the user device, receiving a preliminary set of video commercials selected from an initial set of video commercials based on the identification of the one or more users, determining a user satisfaction score based on attributes associated with the one or more identified users and features associated with each video commercial, an advertiser satisfaction score based on an expected revenue amount for each video commercial and the features associated with each video commercial, and a combined satisfaction score for each video commercial from the preliminary set of video commercials, selecting a primary set of video commercials from the preliminary set of video commercials based on the combined satisfaction score, and providing the primary set of video commercials.

19 Claims, 8 Drawing Sheets

(56) References Cited

U.S. PATENT DOCUMENTS

| | | | |
|---|---|---|---|
| 2008/0306818 A1 | 12/2008 | Evans et al. | |
| 2008/0306819 A1* | 12/2008 | Berkhin | G06Q 30/02 |
| | | | 705/14.54 |
| 2009/0063983 A1 | 3/2009 | Amidon et al. | |
| 2009/0171749 A1 | 7/2009 | Laruelle et al. | |
| 2011/0035277 A1 | 2/2011 | Kodialam et al. | |
| 2011/0072452 A1* | 3/2011 | Shimy | H04N 7/163 |
| | | | 725/25 |
| 2012/0304206 A1* | 11/2012 | Roberts | H04H 60/33 |
| | | | 725/12 |
| 2013/0347033 A1* | 12/2013 | Grab | H04N 21/458 |
| | | | 725/34 |

OTHER PUBLICATIONS

Dimitris et al. "Pricing Optimization Model for Personalized Advertisements in the Context of Digital Television," (12 pages) (2002), http://www.researchgate.net/publication/265203346_Pricing_Optimization_Model_For_Personalized_Advertisements_In_The_Context_Of_Digital_Television.

Adegoke et al. "RPT-INSIGHT-Intel's plans for virtual TV come into focus", (4 pages) (Jun. 8, 2012), http://in.reuters.com/article/2012/06/08/intel-tv-idINL1E8H71UD20120608.

Constine, "Gracenote's Ad Replacement System that Personalizes TX Commericals Will Start Trials in 2013", (9 pages) (Dec. 26, 2012), http://techcrunch.com/2012/12/26/gracenote-tv-targeted-ads/.

Mell et al., "The NIST Definition of Cloud Computing", National Institute of Standards and Technology, Special Publication 800-145, Sep. 2011, pp. 1-7.

\* cited by examiner

SYSTEM AND METHOD FOR SELECTING COMMERCIAL ADVERTISEMENTS

BACKGROUND

The present invention generally relates to selecting commercial advertisements, and more particularly to identifying one or more television viewers and selecting commercial advertisements based on the identification of the one or more television viewers.

Commercial advertisements, such as video commercials, may be designed for a particular audience or demographic. Generally, in the case of broadcast television, a video commercial is broadcast in a timeslot during a commercial break in the broadcast programming. The advertiser associated with the video commercial may select a particular timeslot in the hopes of reaching a receptive audience, e.g., members of a targeted demographic. However, viewers watching television during that timeslot may be outside the targeted demographic, or not receptive to the video commercial, or may vary from television to television. Moreover, a viewing audience for a particular television may include members of several different demographics. In addition, the composition of a viewing audience for a particular television may change during a broadcast session or between broadcast sessions.

SUMMARY

According to one embodiment, a method for personalizing video commercials displayed on a user device is provided. The method may include determining an identification of one or more users viewing the user device, receiving a preliminary set of video commercials selected from an initial set of video commercials based on the identification of the one or more users, determining a user satisfaction score, an advertiser satisfaction score, and a combined satisfaction score for each video commercial from the preliminary set of video commercials, selecting a primary set of video commercials from the preliminary set of video commercials based on the combined satisfaction score, and providing the primary set of video commercials. The user satisfaction score may be determined based on attributes associated with the one or more users and features associated with each video commercial. The advertiser satisfaction score may be determined based on an expected revenue amount for each video commercial and the features associated with each video commercial. The combined satisfaction score may be determined based on the user satisfaction score and the advertiser satisfaction score for each video commercial.

According to another embodiment, a computer program product for personalizing video commercials displayed on a user device is provided. The computer program product may include at least one computer readable non-transitory storage medium having computer readable program instructions for execution by a processor. The computer readable program instructions may include instructions for determining an identification of one or more users viewing the user device, receiving a preliminary set of video commercials selected from an initial set of video commercials based on the identification of the one or more users, determining a user satisfaction score, an advertiser satisfaction score, and a combined satisfaction score for each video commercial from the preliminary set of video commercials, selecting a primary set of video commercials from the preliminary set of video commercials based on the combined satisfaction score, and providing the primary set of video commercials.

According to another embodiment, a computer system for personalizing video commercials displayed on a user device is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for determining an identification of one or more users viewing the user device, receiving a preliminary set of video commercials selected from an initial set of video commercials based on the identification of the one or more users, determining a user satisfaction score, an advertiser satisfaction score, and a combined satisfaction score for each video commercial from the preliminary set of video commercials, selecting a primary set of video commercials from the preliminary set of video commercials based on the combined satisfaction score, and providing the primary set of video commercials.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-7, like numerals being used for like and corresponding parts of the various drawings.

According to one embodiment, provided is a method for personalizing video commercials displayed on a user device by determining an identification of one or more users viewing the user device, receiving a preliminary set of video commercials selected from an initial set of video commercials based on the identification of the one or more users, determining a combined (user and advertiser) satisfaction score for each video commercial from the preliminary set of video commercials, selecting a primary set of video commercials from the preliminary set of video commercials based on the combined satisfaction score, and providing the primary set of video commercials. The user satisfaction score may be determined based on attributes associated with the one or more identified users and features associated with each video commercial. The advertiser satisfaction score may be determined based on an expected revenue amount for each video commercial and the features associated with each video commercial.

The methods, computer program products, and systems disclosed herein may enhance the personalization of video commercials displayed on a user device by identifying users viewing the user device, receiving a preliminary set of video commercials that have been selected based on those users, and providing (e.g., displaying) a primary set of video commercials selected from the preliminary set based on the satisfaction of the users (e.g., interest level) and the satisfaction of the advertisers (e.g., advertising goals). Personalization of video commercials may further be enhanced by subsequently or continuously monitoring (e.g., dynamically identifying) current viewers and providing a primary set of video commercials based on the current viewers (e.g., users currently viewing the user device).

The method, computer program products, and systems disclosed herein may enhance the personalization of video commercials displayed on a user device by selecting video commercials in a distributed fashion that may include selecting a preliminary set of video commercials from an initial set of video commercials on a server or a first device, and selecting a primary set of video commercials from the preliminary set of video commercials on a client or second device. In one embodiment, the methods, computer program products, and systems disclosed herein may be directed to improved management of information, e.g., information related to advertising.

Figure 1:
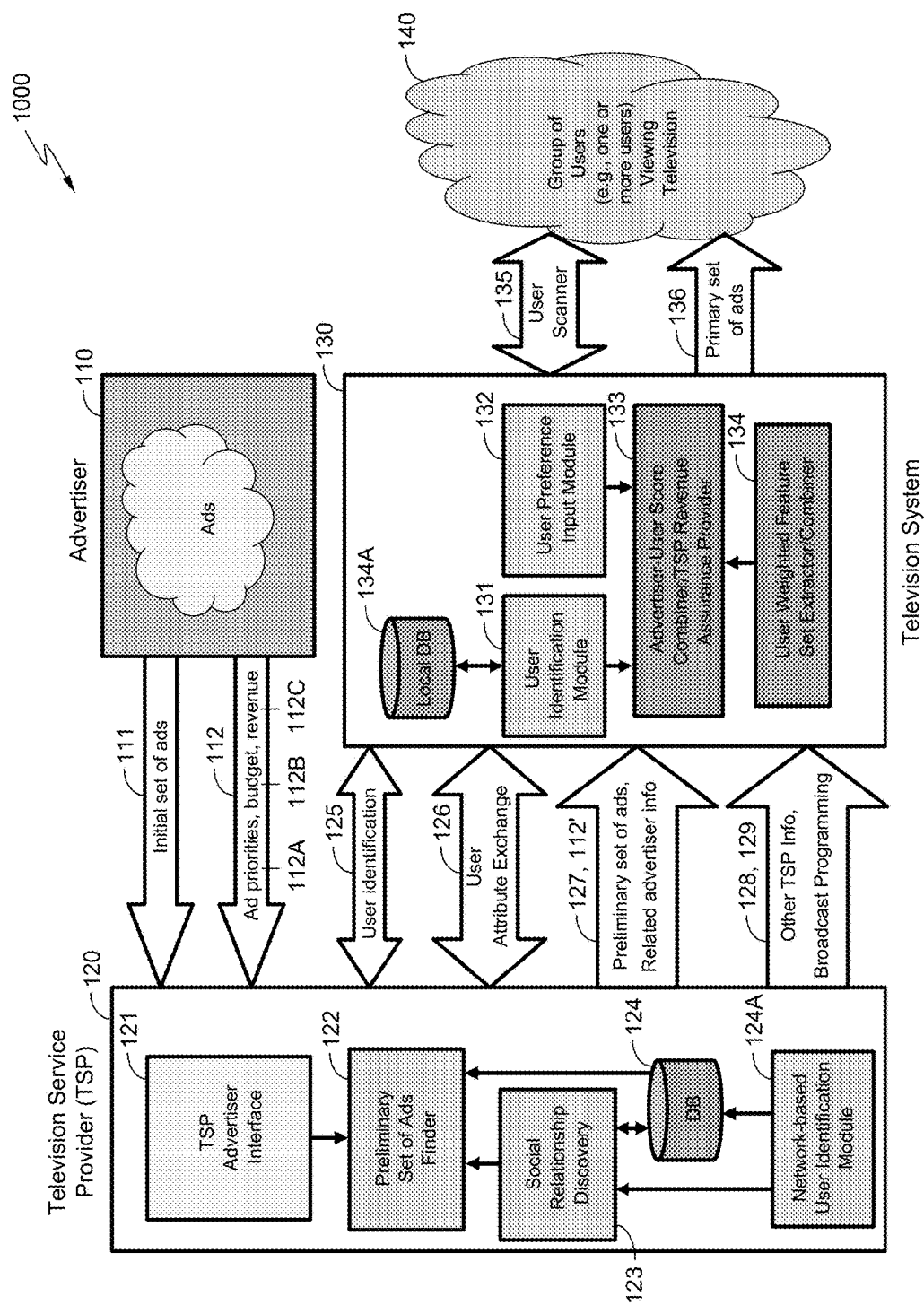
FIG. 1 is a block diagram illustrating an exemplary system employing an exemplary method for personalizing video commercials displayed on a user device, according to an embodiment.

FIG. 1 illustrates an exemplary system 1000 employing an exemplary method for personalizing video commercials displayed on a user device, according to an embodiment. Advertiser 110 (or group of advertisers) may provide advertising content 111 (e.g., an initial set of video commercials) and advertiser information 112 (e.g., advertisement priorities 112A, advertising budget 112B, which may include per-advertisement budgets, and expected revenue per advertisement 112C) to television service provider (or TSP 120). TSP 120 may have a TSP-advertiser interface 121, which advertiser 110 may use to upload/transmit advertising content 111 and advertiser information 112.

TSP 120 may also include a preliminary set of video commercials (i.e., ads) finder module 122, a social relationship discovery module 123, a data store 124, and a network-based user identification module 124A. Module 122 may process/analyze information associated with the users and/or video commercials in conjunction with one or more selection processes. Modules 123 and 124A may identifying users and social relationships, social activities, etc. associated with the users. Data store 124 may contain identifications and other information (e.g., social relationships, social activities, etc.) associated with a plurality of users (e.g., viewers of a given user device).

TSP 120 may exchange (e.g., transmit/receive) content and information with a user device (e.g., television system 130). The content and information may include, but is not limited to, user identification 125 (e.g., identification of one or more users viewing a user device), user attributes 126 (e.g., attributes associated with one or more users, social relationships, etc.), a preliminary set of video commercials 127, related advertiser information 112' (e.g., advertiser information 112 related to the preliminary set of video commercials 127), other TSP information 128 (e.g., duration of commercial break time slot, TSP revenue guarantees, etc.), and broadcast programming 129 (e.g., television programs, etc.).

An exemplary user device, e.g., television system 130, may include user identification module 131, user preference input module 132, advertiser-user score combiner/TSP revenue assurance provider module 133, user weighted feature set extractor/combiner module 134, and local data store 134A. The user identification module 131 may process information obtained by a scanner 135 configured to obtain identifying characteristics of a viewing audience. Scanner 135 may be a scanning device/apparatus including, but not limited to, an imaging device (e.g., video camera), a microphone, fingerprint reader, etc. User preference input module 132 may process user settings pertaining to video commercials displayed on the user device, such as a setting to block advertisements directed to particular subject matter. Modules 133 and 134 may process/analyze information associated with the users and/or video commercials in conjunction with one or more advertisement selection processes. Local data store 134A may store identifying characteristics (and other information) associated with one or more users.

Television system 130 may include a television, a set top box, an internet-connected device, computer, tablet, personal mobile device, etc. User identification module 131 may process, analyze, and/or forward information (e.g., identifying characteristics) associated with one or more users viewing the user device (e.g., television system 130). User preference input module 132 may process, analyze, and/or forward information (e.g., user settings) associated with one or more users viewing the user device or otherwise associated with the user device (e.g., the owner of the user device).

An exemplary user device (e.g., television system 130) may scan a vicinity (e.g., an environment associated with the user device, such as a viewing area) for users (e.g., viewers) viewing and/or in the presence of the user device. An exemplary user device may scan (e.g., with a scanner 135) the vicinity for users (e.g., members of a viewing audience) and obtain identifying characteristics for one or more users.

An exemplary user device (e.g., television system 130) may provide/display a primary set of video commercials 136, e.g., to a group of users viewing the user device.

It will be appreciated that the system components, modules and other items, as well as the directions and orientations of arrows, depicted in FIG. 1 are exemplary and other configurations and modifications are contemplated, including those well-known in the art.

Figure 2:
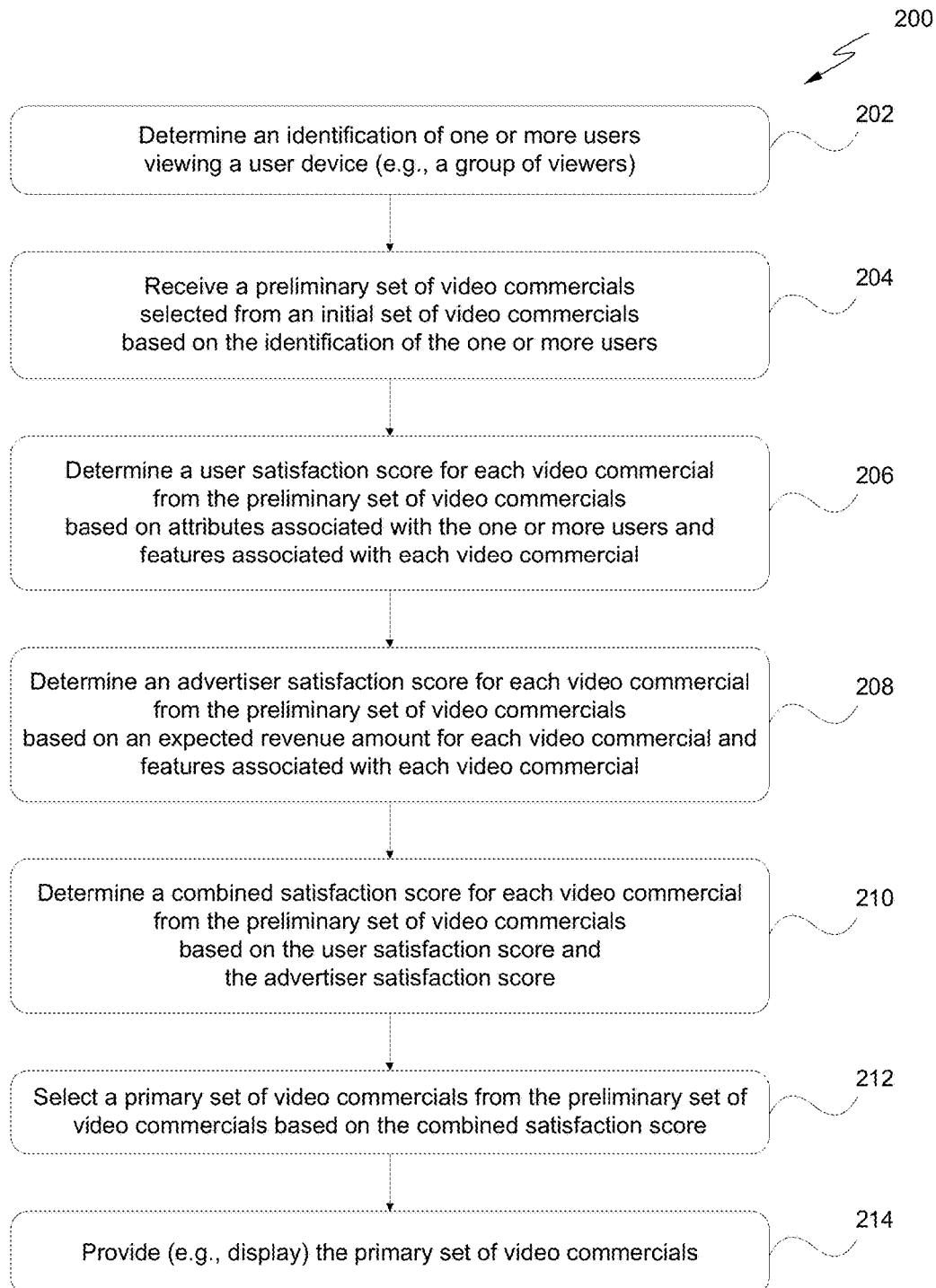
FIG. 2 is a flowchart illustrating an exemplary method for personalizing video commercials displayed on a user device, according to an embodiment.

FIG. 2 illustrates a first flow chart 200 depicting an exemplary method for personalizing video commercials displayed on a user device, according to an embodiment. At 202, an identification of one or more users viewing a user device (e.g., a group of viewers) may be determined. In one embodiment, the identification of the one or more users may be determined based on unique, identifying characteristics of the one or more users. Identifying characteristics may include any features or other metrics that may be used to uniquely identify a user. In one embodiment, identifying characteristics may be obtained from one or more images of a user, e.g., via facial recognition techniques. Other metrics may include metrics associated with a user's eyeball, fingerprints, voice, etc.

At 204, a preliminary set of video commercials (e.g., advertisements) selected from an initial set of video commercials based on the identification of the one or more users may be received. In one embodiment, the initial set of video commercials may be provided by an advertiser (or group of advertisers). In one embodiment, the preliminary set of video commercials may be provided by the TSP.

The selection of the preliminary set of video commercials from the initial set of video commercials may be based on attributes associated with the one or more users, such as, descriptive, categorical attributes that may be applicable to advertisements (e.g., demographic information, predicted and/or actual product purchasing behavior, product preferences, media/genre preferences, etc.). Attributes may also include any personal information associated with the user, which may be available, such as internet browsing activity, calendar events, social network activity, etc.

In one embodiment, attributes may be determined and/or assigned based on identifying the user and analyzing available information associated with user. Attributes may also be assigned to users identified as household members based on publicly available information associated with the household. It will be appreciated that the level of personalization may increase with an increased level of identification of the user and an increased level of access to information associated with the user, e.g., access to the user's calendar, social networking sites, etc. For example, access may be granted to third party services via an opt-in request/feature.

In one embodiment, one or more attributes may be weighted based on significance of an attribute to a user, or based on any known or contemplated methodology for optimizing predictions (e.g., machine-learned insights from large data sets).

In the case of multiple viewers (e.g., a group of viewers), attributes associated with the one or more users may include, but are not limited to, predicted and/or actual combined product purchasing behavior, combined product preferences, combined media/genre preferences, etc. Other attributes may include social relationships, social activities, social hierarchy (e.g., parent-child, coach-player), etc. One or more attributes may also be weighted based on significance of an attribute to the group of viewers, or based on the attributes associated with a particular user among the group of viewers. For example, attributes of a social leader among a group of viewers may be weighted over attributes of other members of the group. In another example, features of a video commercial that may resonate (i.e., score higher in terms of preference) with a majority of members of the group may be weighted more heavily.

The selection of the preliminary set of video commercials may also be based on features associated with each video commercial from the initial set of video commercials (e.g., product category, content of the advertisement, predicted and/or actual performance of the advertisement, etc.). A selected video commercial may have features that may appeal to a user having attributes that may indicate a preference for the selected video commercial. For example, a user may be identified as having the following attributes: a 30 year old male with a preference for sports cars and action movies/programs. A selected advertisement may be for a car or an action movie, if those advertisements are among the initial set of video commercials.

Features associated with a video commercial may include, but are not limited to, advertiser information (e.g., total advertising budget, per-advertisement budget, advertisement priority, expected revenue from an advertisement), performance of an advertisement (e.g., per demographic category), a user's preference for a type of advertisement, and data-mined predictions (e.g., machine-learned insights).

In one embodiment, the selection of the preliminary set of video commercials from the initial set of video commercials may be based on combining a feature set containing the attributes associated with the one or more users and another feature set containing the features associated with each video commercial from the preliminary set of video commercials. The feature set and the another feature set may be combined via, e.g., machine-learned techniques, set unions, set intersections, additions, overlap computations, etc. The results of the combination of the feature set and the another feature set may provide an approximate match score, which may indicate a level of a user's (or group's) preference for a particular video commercial.

At 206, a user satisfaction score for each video commercial from the preliminary set of video commercials may be determined based on attributes associated with the one or more users and features associated with each video commercial. For example, each video commercial from the preliminary set of video commercials may be given a user satisfaction score, which may indicate a level of a user's (or group's) preference for a particular video commercial. The user satisfaction score may be determined by combining feature sets, respectively, containing the attributes associated with the one or more users and the features associated with each video commercial. The feature sets may be combined via, e.g., machine-learned techniques, set unions, set intersections, additions, overlap computations, etc. In one embodiment, the user satisfaction score for a video commercial may be equivalent to the approximate match score for the video commercial. In another embodiment, the user satisfaction score may be based on one or more locally detected variables associated with one or more users. For example, dynamically (i.e., temporally) detected variables such as conversation topics (e.g., speech recognition of various keywords), current mood (e.g., facial recognition of various facial contortions), etc. may influence the user satisfaction score for a particular video commercial.

At 208, an advertiser satisfaction score for each video commercial from the preliminary set of video commercials may be determined based on an expected revenue amount for each video commercial and features associated with each video commercial. The expected revenue amount may be provided by the advertiser associated with the video commercial.

At 210, a combined satisfaction score for each video commercial from the preliminary set of video commercials may be determined based on the user satisfaction score and the advertiser satisfaction score. For example, the combined satisfaction score may be determined by combining the user satisfaction score and the advertiser satisfaction score, e.g., via, e.g., machine-learned techniques, set unions, set intersections, additions, overlap computations, etc.

At 212, a primary set of video commercials may be selected from the preliminary set of video commercials based on the combined satisfaction score. In one embodiment, the selection of the primary set of video commercials may include ranking each video commercial based on the combined satisfaction score and selecting the primary set of video commercials based on the ranking. In one embodiment, the selection of the primary set of video commercials may include removing any video commercial violating one or more user settings. For example, a user setting may prohibit video commercials associated with gambling activity. In such case, any video commercials associated with gambling activity may not be included with the primary set of video commercials.

At 214, the primary set of video commercials is provided, e.g., by displaying the video commercials on the user's device.

In one embodiment, the display of the video commercials from the primary set of video commercials may be based on the combined satisfaction score, e.g., providing video commercials from the primary set of video commercials in sequence based on the ranking (e.g., ranked combined satisfaction score). For example, the highest ranking video commercials may be displayed first. In one embodiment, the display of the video commercials may be optimized according to methods known in the art, e.g., avoiding sequential display of advertisements for competing products in the same product category.

Figure 3:
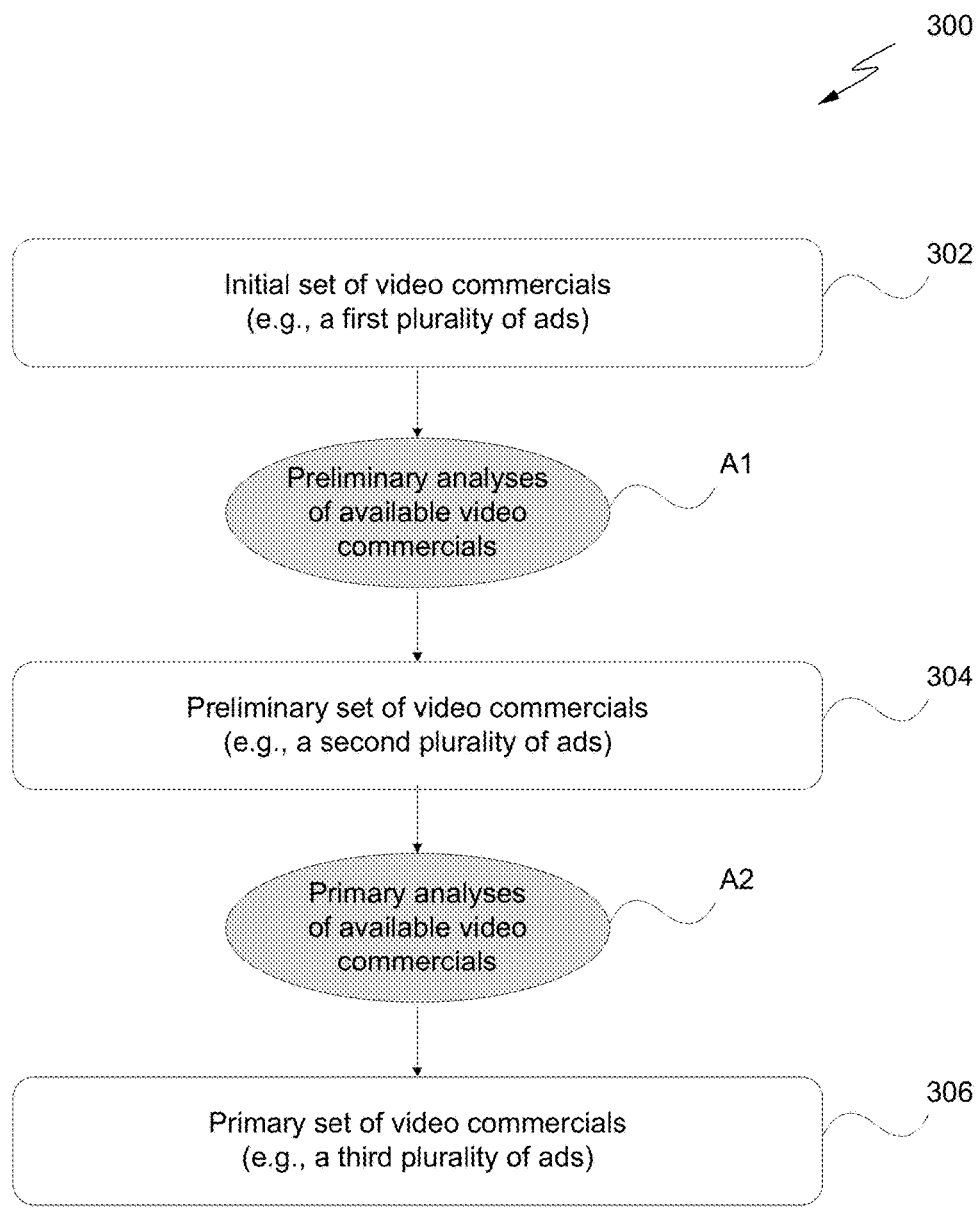
FIG. 3 is a flowchart illustrating an aspect of an exemplary method for personalizing video commercials displayed on a user device, according to an embodiment.

FIG. 3 illustrates a second flow chart 300 depicting an aspect of an exemplary method for personalizing video commercials displayed on a user device, according to an embodiment. At 302, an initial set of video commercials, e.g., a first plurality of advertisements, is provided. The initial set of video commercials may include advertisements that may be intended to air during a broadcast transmission. The advertisements may be intended for display during a particular date range (e.g., quarter, month, week, etc.), during a particular time slot (e.g., weeknights from 6:00 PM to 7:00 PM, Saturday mornings, etc.), during a particular broadcast (e.g., during a football game), or any other contemplated air date/time designation or combination. The advertisements may be intended for a particular channel or group of channels.

The initial set of video commercials may be provided by an advertiser (or group of advertisers). In one embodiment, the initial set of video commercials may be provided to a TSP. In one embodiment, the initial set of video commercials may be provided on a predetermined date/time. In another embodiment, another initial set of video commercials including one or more different video commercials may be provided on a subsequent predetermined date/time, e.g., on a regular, semi-regular, or irregular basis.

At A1, preliminary analyses of available video commercials (e.g., video commercials from the initial set of video commercials) is performed. The preliminary analyses may include any analysis disclosed or contemplated herein. In one embodiment, the preliminary analyses may include determining features associated with each video commercial from the initial set of video commercials. In one embodiment, the preliminary analyses may include selecting a subset of video commercials from the initial set of video commercials based on information associated with an audience of a user device, e.g., attributes associated with one or more users viewing the user device, and the features associated with each video commercial from the initial set of video commercials. In one embodiment, the preliminary analyses may be performed on a device or system associated with a TSP, e.g., a server or TSP system. The preliminary analyses may be performed upon or after receipt of the initial set of video commercials. The preliminary analysis may be performed upon or after receipt of information associated with an audience of a user device. Subsequent preliminary analyses may be performed on the initial set of video commercials based on additional (e.g., new, updated, and/or different) information associated with the audience of the user device.

In a non-limiting example, an initial set of video commercials may be provided to a TSP at the beginning of a particular week and a first preliminary analysis may be performed after receipt of the initial set of video commercials. A subsequent preliminary analysis may be performed each morning during the particular week. Each subsequent preliminary analysis may include (additional, supplemental) information associated with an audience of a user device, which has been gathered since the previous preliminary analysis. In such example, multiple subsets of video commercials may be identified and/or selected from the initial set of video commercials based on variable information.

For example, on a Sunday, a first audience for a user device may consist of parents, children, and visiting grandparents. A first preliminary analysis may identify and/or select a first subset of video commercials (from the initial set of video commercials) based on the first audience. On a Monday, a second audience may consist of parents, children, and a babysitter. A subsequent preliminary analysis may identify and/or select a second subset of video commercials based on that audience.

At 304, a preliminary set of video commercials is provided. In one embodiment, the preliminary set of video commercials is a subset of video commercials selected from the initial set of video commercials 302. The preliminary set of video commercials may be selected based on preliminary analyses A1 performed on the initial set of video commercials 302. In one embodiment, the preliminary set of video commercials may be provided to a user device, e.g., television system 130 (depicted in FIG. 1).

At A2, primary analyses of available commercials (e.g., video commercials from the preliminary set of video commercials) is performed. The primary analyses may include any analysis disclosed or contemplated herein. In one embodiment, the primary analyses may include determining features associated with each video commercial from the preliminary set of video commercials. In one embodiment, the primary analyses may include selecting a subset of video commercials from the preliminary set of video commercials based on information associated with an audience of a user device, e.g., attributes associated with one or more users viewing the user device, and the features associated with each video commercial from the initial set of video commercials.

In one embodiment, the primary analysis may include determining a user satisfaction score for each video commercial from the preliminary set of video commercials based on attributes associated with the one or more users and features associated with each video commercial. In one embodiment, the primary analyses may include determining an advertiser satisfaction score for each video commercial from the preliminary set of video commercials based on an expected revenue amount for each video commercial and features associated with each video commercial. In one embodiment, the primary analyses may include determining a combined satisfaction score for each video commercial from the preliminary set of video commercials based on the user satisfaction score and the advertiser satisfaction score.

In one embodiment, the primary analyses may be performed on a user device, e.g., television system 130 (depicted in FIG. 1). The primary analyses may be performed upon or after receipt of the preliminary set of video commercials. The primary analyses may be performed upon or after receipt of information associated with an audience of the user device. Subsequent preliminary analyses may be performed on the preliminary set of video commercials based on additional (e.g., new, updated, and/or different) information associated with the audience of the user device.

In a non-limiting example, a preliminary set of video commercials may be provided to a user device at the beginning of a particular day and a first primary analysis may be performed after receipt of the preliminary set of video commercials. A subsequent primary analysis may be performed each time a monitor (e.g., television) associated with the user device is turned on. Each subsequent preliminary analysis may include information associated with an audience of the user device, which has been gathered after the monitor has been turned on. In the case of continuous monitoring (e.g., via continuous facial recognition analyses of video imagery of a viewing audience), a subsequent primary analysis may be performed each time the audience changes (e.g., a member/user leaves the group, a new member/user joins the group, etc.).

In the case of continuous monitoring of a locally detectible variable associated with the audience, a subsequent primary analysis may be performed when a predetermined variable is detected. For example, audience audio may be monitored and a particular conversation topic may be detected (e.g., via speech recognition of a predetermined keyword(s)), after which a subsequent primary analysis may be performed to identify/select a subset of video commercials that cater to the audience and the topic of conversation of the audience.

At 306, a primary set of video commercials is provided. In one embodiment, the primary set of video commercials is a subset of video commercials selected from the preliminary set of video commercials 304. The primary set of video commercials may be selected based on primary analyses A2 performed on the preliminary set of video commercials 304.

In one embodiment, the initial set of video commercials may include a number of video commercials that is greater than the number of video commercials in the preliminary set of video commercials, and a number of video commercials in the preliminary set of video commercials is greater than the number of video commercials in the primary set of video commercials. In one embodiment, a cumulative playback duration of the preliminary set of video commercials exceeds a predetermined playback duration threshold. For example, a particular commercial break in a programming broadcast may be 120 seconds, the predetermined playback duration threshold may be 240 seconds. In such example, the cumulative playback duration of the preliminary set of video commercials is twice the length of the commercial break. In one embodiment, the cumulative playback duration of the primary set of video commercials is equal to the length of the commercial break during which video commercials will be displayed.

The methods disclosed herein may enhance the personalization of video commercials displayed on a user device by selecting a preliminary set of video commercials from an initial set of video commercials based on an initial assessment of a viewing audience, and further selecting a primary set of video commercials to display from the preliminary set of video commercials based on subsequent and/or continual assessments of the viewing audience.

Figure 4A:
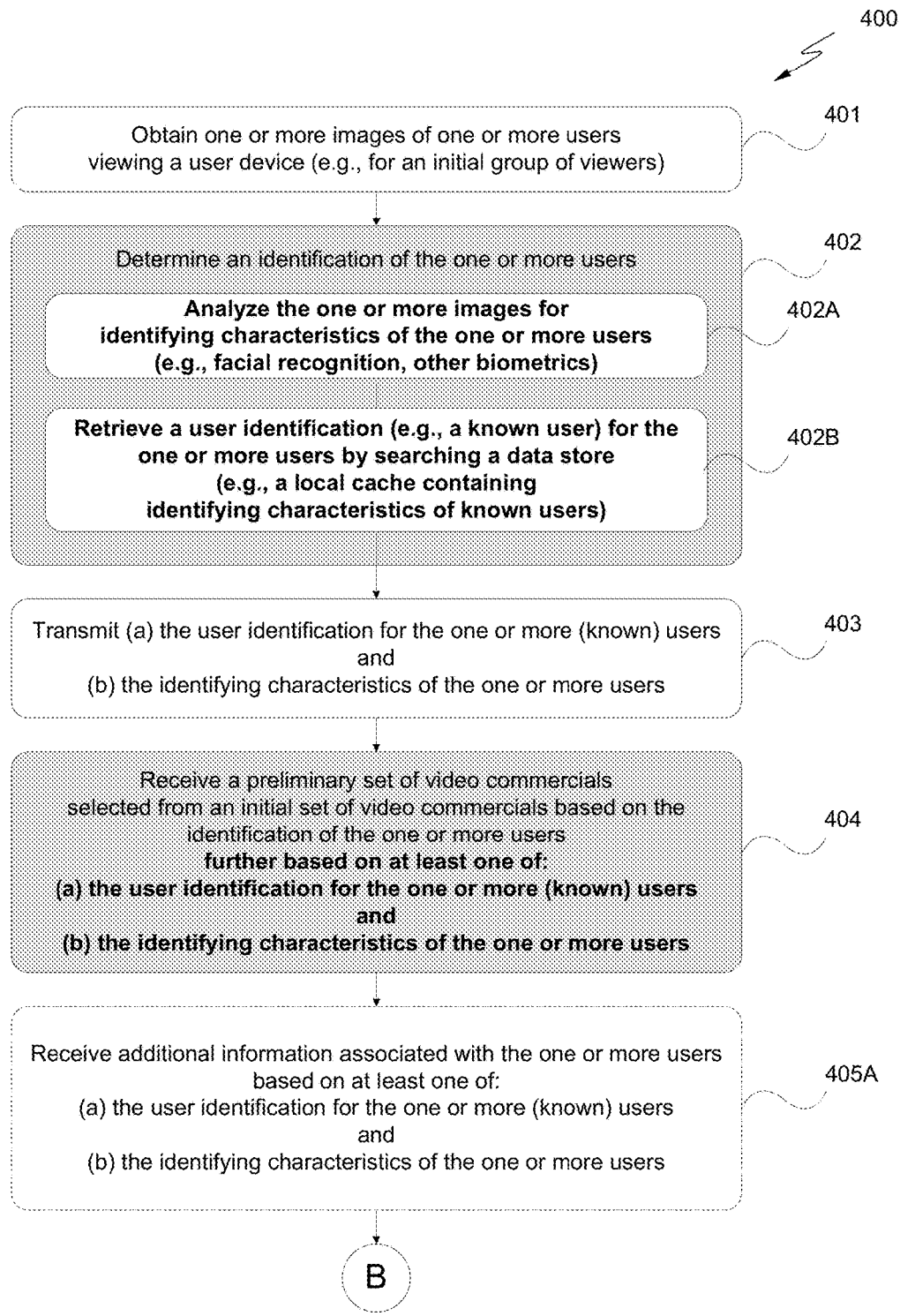
FIGS. 4A and 4B are flowcharts illustrating additional aspects of an exemplary method for personalizing video commercials displayed on a user device, according to an embodiment.
Figure 4B:
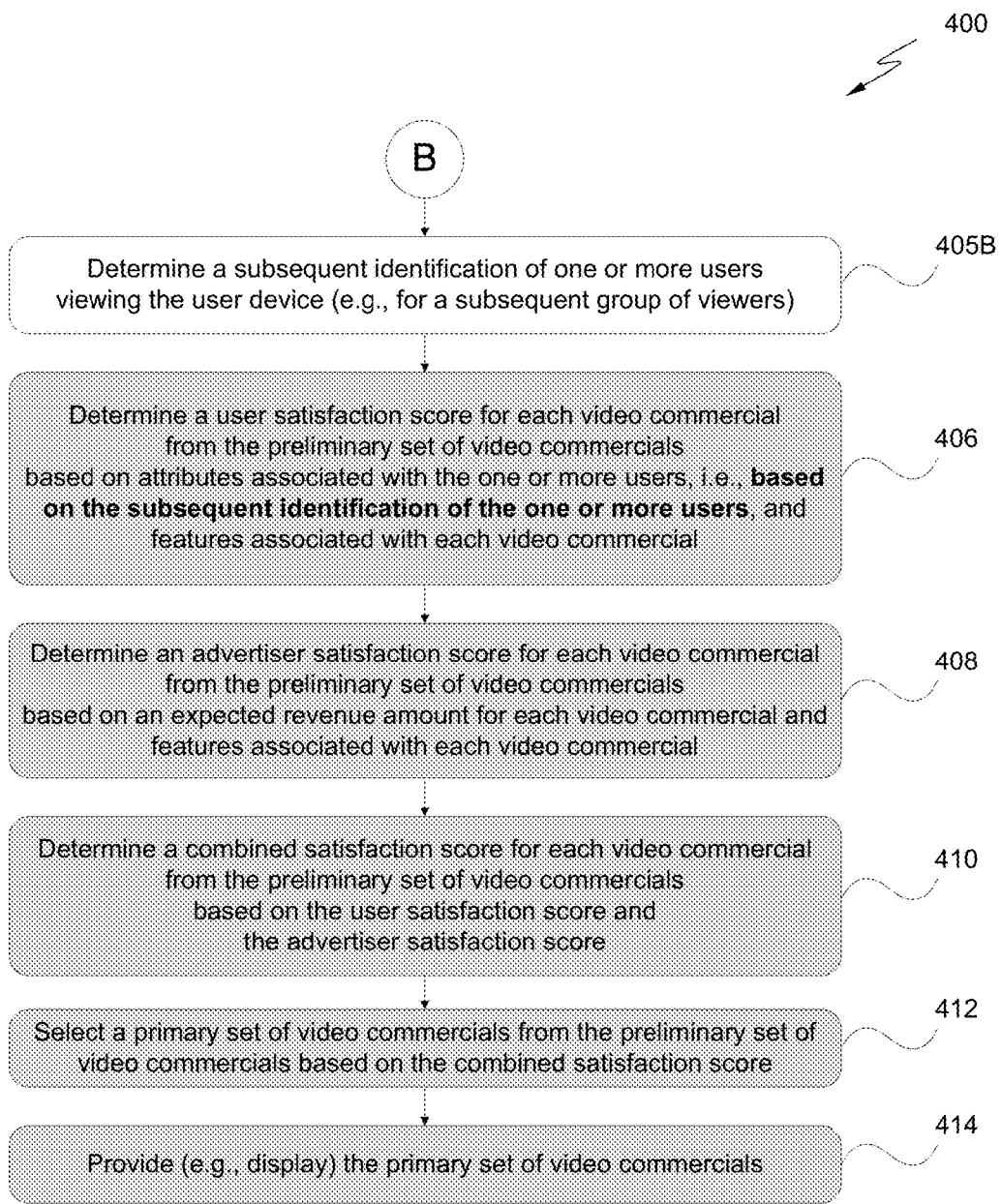

FIGS. 4A and 4B illustrate a third flow chart 400 depicting additional aspects of an exemplary method for personalizing video commercials displayed on a user device, according to an embodiment. At 401, one or more images of one or more users viewing a user device (e.g., for an initial group of viewers) may be obtained. In one embodiment, the one or more images may be obtained using an imaging device (e.g., video camera).

At 402, an identification of one or more users viewing the user device may be determined by analyzing the one or more images and retrieving one or more user identifications. At 402A, the one or more images of the one or more viewers may be analyzed for identifying characteristics of the one or more users (e.g., using facial recognition techniques or analysis of other biometrics).

At 402B, a user identification for the one or more users may be retrieved from a data store (e.g., local data store 134A, depicted in FIG. 1). The data store may be searched for a user identification associated with the identifying characteristics obtained from the analysis of the one or more images of the one or more viewers. A user with a stored user identification may be considered a known user. A user without a stored user identification may be considered an unknown user, e.g., a first time user or first time viewer. The data store may be included with the user device, e.g., a local cache, or may be separate from the user device. The data store may store a user identification, identifying characteristics, and attributes associated with a user.

At 403, the user identification for one or more users and the identifying characteristics of the one or more users may be transmitted for further analysis, e.g., by a server associated with a TSP. The user identification may include a user identification of a known user. In one embodiment, the user identification may be associated with an unknown user and the unknown user's accompanying identifying characteristics may be used to identify the unknown user by network-based identification techniques (e.g., searching internet websites, other databases, etc.).

With reference to FIG. 1, in one embodiment, the user identification and the identifying characteristics of the one or more users may be transmitted to TSP 120, saved to data store 124, and further analyzed by social relationship discovery module 123 and/or network-based user identification module 124A. The user identification and the identifying characteristics, along with other user identifications and the analyses of the aforementioned modules may be sent to preliminary set of ads finder module 122, which may use the information and analyses in the selection of a preliminary set of video commercials.

Referring back to FIGS. 4A and 4B, at 404, a preliminary set of video commercials (e.g., advertisements) selected from an initial set of video commercials based on the identification of the one or more users may be received. This part of third flowchart 400 is similar to part 204 of first flowchart 200, depicted in FIG. 2 and discussed above; however, the selection of the preliminary set of video commercials may be further based on at least one of (a) the user identification for the one or more (known) users and (b) the identifying characteristics of the one or more users.

Optionally, at 405A, additional information associated with the one or more users may be received. The additional information may be based on at least one of (a) the user identification for the one or more (known) users and (b) the identifying characteristics of the one or more users. For example, a known user and an unknown user are identified by a user device. A server-based analysis of the known user determines that the known user has a calendar event coming up. In addition, the unknown user is identified as a co-worker of the known user. This additional information may be used to select a preliminary set of video commercials and may also be sent to the user device, e.g., to be stored on a local data store.

At 405B, a subsequent identification of one or more users viewing the user device (e.g., a subsequent group of viewers) may be determined. The subsequent identification may be part of continuous monitoring of a viewing audience. The processes associated with a first identification of the one or more users (e.g., discussed above for parts 402, 402A, 402B) may be repeated for the subsequent identification.

At 406, a user satisfaction score for each of video commercial from the preliminary set of video commercials may be determined based on attributes associated with the one or more users and features associated with each video commercial. This part of the flowchart is similar to part 206 of first flowchart 200, depicted in FIG. 2 and discussed above; however, the attributes associated with the one or more users are based on the subsequent identification of the one or more users determined at 405B.

The remaining parts of third flowchart 400 (i.e., parts 408, 410, 412, 414) are similar to parts 208, 210, 212, 214 of first flowchart 200, depicted in FIG. 2 and discussed above.

The methods disclosed herein provide personalization of video commercials displayed on a user device by identifying one or more users viewing the user device, receiving a preliminary set of video commercials based on the identification of the one or more users, determining satisfactions scores for the video commercials in the preliminary set based on attributes of the one or more users and features of the video commercials, and determining a primary set of video commercials to display based on the satisfaction scores.

In one embodiment, the methods disclosed herein may provide improved management of information related to advertising, e.g., by receiving a preliminary set of video commercials, which may have been selected from a larger set of video commercials on a first device (e.g., a TSP server), and determining a primary set of video commercials on a second device (e.g., a user device). The preliminary set of video commercials may be selected from a larger set of video commercials (e.g., an initial set of video commercials). Transmitting a smaller set of video commercials (e.g., the preliminary set of video commercials) to a user device may preserve network resources (e.g., network bandwidth) compared to transmitting the larger set of video commercials (e.g., the initial set of video commercials). Performing certain determinations (e.g., determining satisfaction scores) locally (e.g., on a user device) and on a smaller subset of video commercials (i.e., the primary set of video commercials) may allow for more complex and multivariate computations to be performed in a quicker and dynamic fashion. For example, if a change in mood of one or more users is detected, a lower ranked video commercial (based on the combined satisfaction score) may be given a higher rank based on the user's changed mood and may be provided instead of another previously higher ranked video commercial.

In one embodiment, determining the identification of one or more users includes obtaining identifying characteristics for the one or more users.

In another embodiment, the method further includes obtaining one or more images of the one of more users and obtaining identifying characteristics for the one or more users includes analyzing the one or more images of the one or more users.

In another embodiment, determining the identification of one or more users further includes retrieving a user identification for each of the one or more users based on the identifying characteristics of the one or more users.

In another embodiment, retrieving the user identification for each of the one or more users includes identifying at least one of a known user and an unknown user, and includes searching a data store based on the identifying characteristics of the one or more users. The data store contains identifying characteristics of the known user and may not contain identifying characteristics of the unknown user. It will be appreciated that the unknown user may become a known user upon identification, either by receiving identification from another source (e.g., a server-based data store, or network-based identification module) or upon a subsequent viewing session with the user device.

In another embodiment, the method further includes transmitting the user identification for each of the one or more users and the identifying characteristics of the one or more users, and the preliminary set of video commercials are selected based on at least one of the user identification for each of the one or more users and the identifying characteristics of the one or more users.

In another embodiment, the method further includes receiving additional information associated with the one or more users based on at least one of the user identification for each of the one or more users and the identifying characteristics of the one or more users.

In one embodiment, the preliminary set of video commercials are received form a cloud-based service (e.g., middleware service). In one embodiment, one or more parts of the methods disclosed herein may be performed as a cloud-based service. In one embodiment, one or more services associated with the TSP are provided as a cloud-based service. In one embodiment, the method is provided as a cloud-based service.

In one embodiment, the preliminary set of video commercials is selected from the initial set of video commercials based on the attributes associated with the one or more users and features associated with initial set of video commercials.

In one embodiment, the preliminary set of video commercials has a cumulative playback duration exceeding a predetermined playback duration threshold.

In one embodiment, determining the user satisfaction score for each video commercial from the preliminary set of video commercials includes determining a convergence between the attributes associated with the one or more users and the features associated with each video commercial from the preliminary set of video commercials. It will be appreciated that any technique known or contemplated in the art may be used to determine the overlap (e.g., convergence) between the sets containing the user attributes and the commercial features to find commercials that may appeal to the one or more users.

In another embodiment, determining at least one of the user satisfaction score and the advertiser satisfaction score is based on one or more locally detected variables associated with one or more users. In a further embodiment, the one or more locally detected variables may be continually monitored by the user device.

In one embodiment, selecting the primary set of video commercials from the preliminary set of video commercials includes ranking each video commercial from the preliminary set of video commercials based on the combined satisfaction score, and selecting the primary set of video commercials based on the ranking, and providing the primary set of video commercials includes providing video commercials from the primary set of video commercials in sequence based on the ranking.

In one embodiment, the method further includes receiving one or more user settings associated with the user device, and selecting the primary set of video commercials from the preliminary set of video commercials includes removing one or more video commercials violating the one or more user settings.

In one embodiment, a cumulative expected revenue amount associated with the primary set of video commercials exceeds a predetermined advertisement revenue threshold. For example, a TSP may guarantee a minimum revenue amount associated with the display/broadcast of a set of advertisements. A determination of an expected revenue amount associated with each video commercial included in the primary set of video commercials may determine which video commercials are included in the primary set of video commercials to ensure that a cumulative expected revenue amount for the primary set of video commercials exceeds the TSP's guaranteed minimum revenue amount (e.g., a predetermined advertisement revenue threshold).

In one embodiment, the attributes associated with the one or more users are based on the identification of the one or more users. In another embodiment, the method further includes determining attributes associated with the one or more users based on the identification of the one or more users.

In one embodiment, the method further includes determining a subsequent identification of one or more users viewing the user device, and the attributes associated with the one or more users are based on the subsequent identification of the one or more users. In another embodiment, the method further includes determining attributes associated with the one or more users based on the subsequent identification of the one or more users.

In one embodiment, the user device includes a television.

It is contemplated that one or more additional video commercials or other content may be provided to a user device along with the preliminary set of video commercials and displayed along with the video commercials from the primary set of video commercials. Such additional video commercials or other content may not have been analyzed and/or scored for personalization and may be considered outside the disclosed sets of video commercials (i.e., the preliminary set, the primary set, etc.), but may be provided/displayed in addition to the video commercials that have been personalized for one or more users in accordance with the methods disclosed herein.

Figure 5:
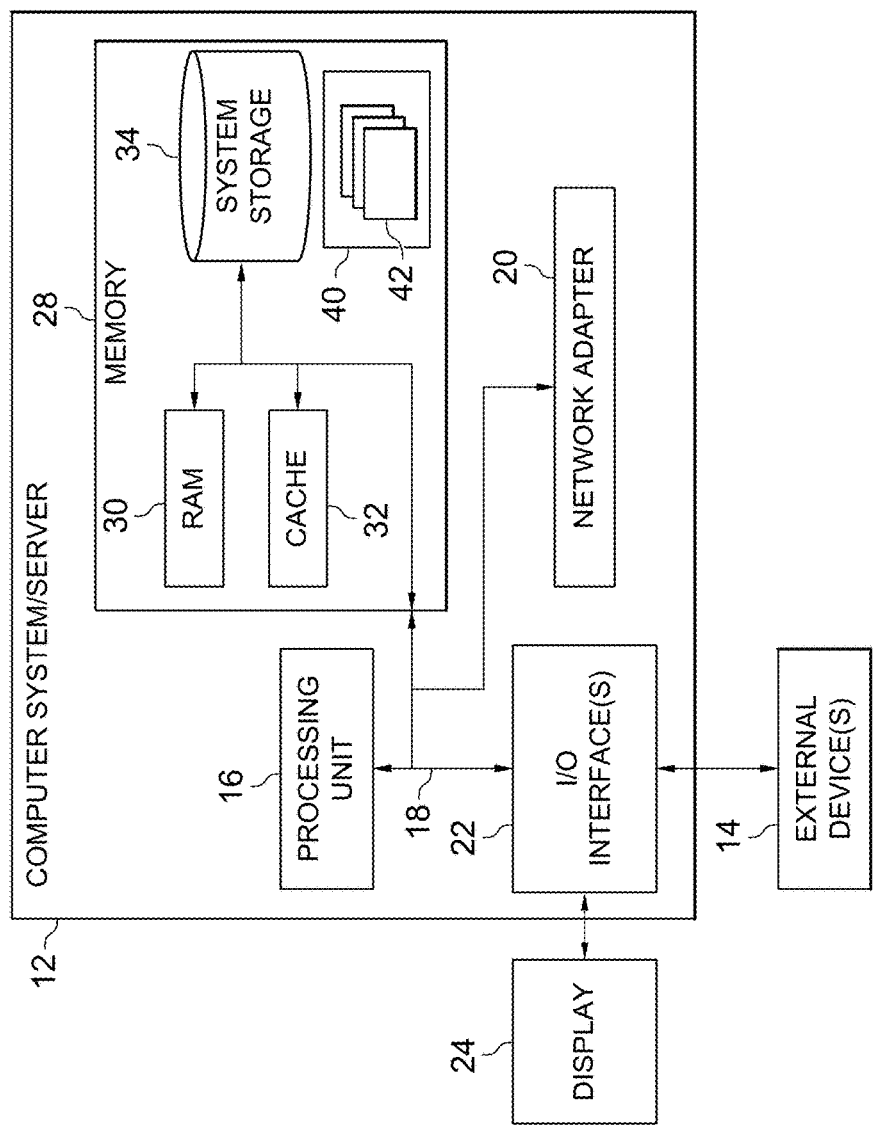
FIG. 5 is a block diagram illustrating a computing node, according to an aspect of the invention.

FIG. 5 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
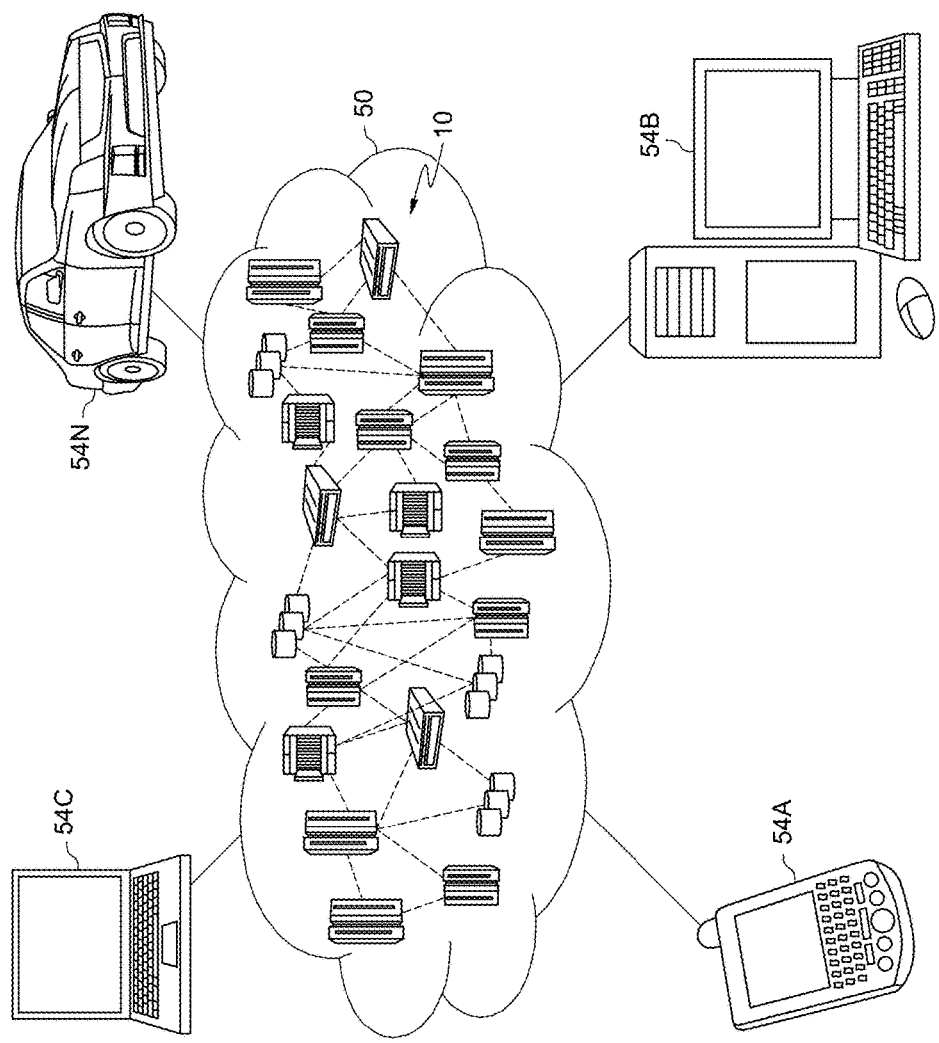
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
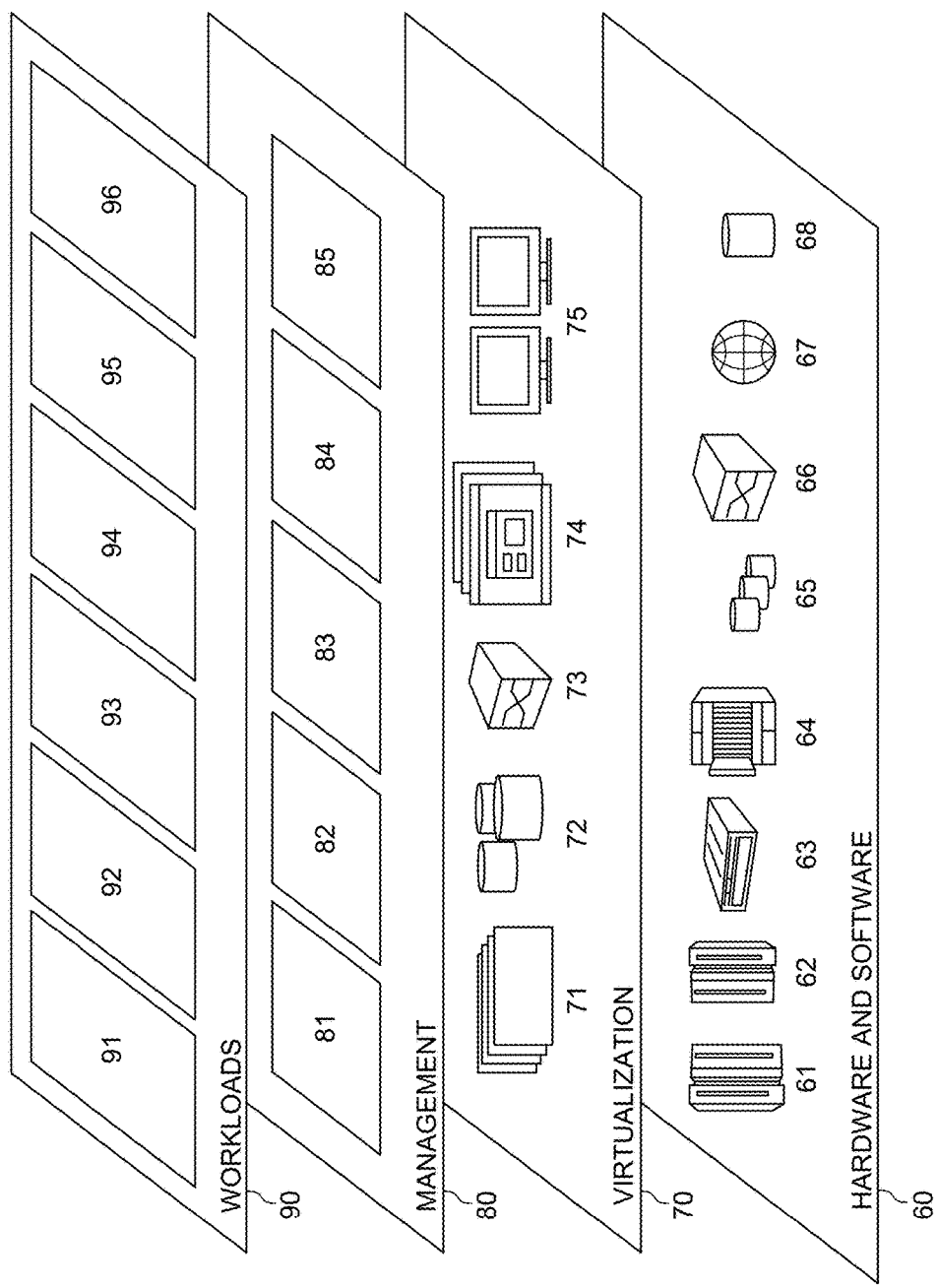
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized video commercial processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for personalizing video commercials displayed on a user device, the method comprising:
    determining an identification of a plurality of users by utilizing a user device to identify characteristics of the plurality of users based on facial recognition techniques and biometrics, wherein the determined identification of the plurality of users is continuously monitored and automatically modified, in real time, based on a change in the plurality of users;
    receiving a preliminary set of video commercials selected from an initial set of video commercials based on the identification of the plurality of users and the analysis of a plurality of social relationships between the users, wherein the preliminary set of video commercials are received from a cloud-based service, and wherein one or more services are associated with a television service provider;
    determining a user satisfaction score for each video commercial from the preliminary set of video commercials based on attributes associated with the plurality of users, an audio device associated with monitoring and detecting speech recognition for a plurality of predetermined keywords, and features associated with each video commercial, wherein the attributes associated with the plurality of users includes a plurality of moods associated with the plurality of users based on facial recognition techniques of a plurality of facial contortions, wherein the attributes associated with a plurality of users is weighted based on the significance of one or more attributes to the plurality of users to optimize one or more predictions, wherein the plurality of features associated with the video commercial that resonate with a majority of the plurality of users are weighted more heavily;
    determining an advertiser satisfaction score for each video commercial from the preliminary set of video commercials based on an expected revenue amount for each video commercial and the features associated with each video commercial;
    determining a combined satisfaction score for each video commercial from the preliminary set of video commercials based on the user satisfaction score and the advertiser satisfaction score for each video commercial;
    dynamically selecting a primary set of video commercials from the preliminary set of video commercials based on the combined satisfaction score, wherein the selected primary set of video commercials is a smaller set of the video commercials from the preliminary set of video commercials; and
    providing the primary set of video commercials.

2. The method according to claim 1, wherein determining the identification of the plurality of users comprises obtaining identifying characteristics for the plurality of users.

3. The method according to claim 2, further comprising: obtaining one or more images of the plurality of users, and wherein obtaining identifying characteristics for the plurality of users comprises analyzing the one or more images of the plurality of users.

4. The method according to claim 2, wherein determining the identification of the plurality of users further comprises retrieving a user identification for each of the plurality of users based on the identifying characteristics of the plurality of users.

5. The method according to claim 4, wherein retrieving the user identification for each of the plurality of users comprises identifying at least one of a known user and an unknown user, wherein the identifying comprises searching a data store based on the identifying characteristics of the plurality of users, and wherein the data store contains identifying characteristics of the known user.

6. The method according to claim 5, further comprising: transmitting the user identification for each of the plurality of users and the identifying characteristics of the plurality of users, and
wherein the preliminary set of video commercials are selected based on at least one of the user identification for each of the plurality of users and the identifying characteristics of the plurality of users.

7. The method according to claim 6, further comprising: receiving additional information associated with the plurality of users based on at least one of the user identification for each of the plurality of users and the identifying characteristics of the plurality of users.

8. The method according to claim 1, wherein the preliminary set of video commercials is selected from the initial set of video commercials based on the attributes associated with the plurality of users and features associated with the initial set of video commercials.

9. The method according to claim 1, wherein the preliminary set of video commercials has a cumulative playback duration exceeding a predetermined playback duration threshold.

10. The method according to claim 1, wherein determining the user satisfaction score for each video commercial from the preliminary set of video commercials comprises determining a convergence between the attributes associated with the plurality of users and the features associated with each video commercial from the preliminary set of video commercials.

11. The method according to claim 10, wherein determining at least one of the user satisfaction score and the advertiser satisfaction score is based on one or more locally detected variables associated with the plurality of users, and wherein the one or more locally detected variables are continually monitored by the user device.

12. The method according to claim 1, wherein selecting the primary set of video commercials from the preliminary set of video commercials comprises ranking each video commercial from the preliminary set of video commercials based on the combined satisfaction score, and selecting the primary set of video commercials based on the ranking, and wherein providing the primary set of video commercials comprises providing video commercials from the primary set of video commercials in sequence based on the ranking.

13. The method according to claim 1, further comprising: receiving one or more user settings associated with the user device, and
wherein selecting the primary set of video commercials from the preliminary set of video commercials comprises removing one or more video commercials violating the one or more user settings.

14. The method according to claim 1, wherein a cumulative expected revenue amount associated with the primary set of video commercials exceeds a predetermined advertisement revenue threshold.

15. The method according to claim 1, wherein the attributes associated with the plurality of users are based on the identification of the plurality of users.

16. The method according to claim 1, further comprising: determining a subsequent identification of the plurality of users viewing the user device, and wherein the attributes associated with the plurality of users are based on the subsequent identification of the plurality of users.

17. The method according to claim 1, wherein the user device comprises a television.

18. A computer program product for personalizing video commercials displayed on a user device, the computer program product comprising at least one computer readable non-transitory storage medium having computer readable program instructions thereon for execution by a processor, the computer readable program instructions comprising program instructions for:
determining an identification of a plurality of users by utilizing a user device to identify characteristics of the plurality of users based on facial recognition techniques and biometrics wherein the determined identification of the plurality of users is continuously monitored and automatically modified, in real time, based on a change in the plurality of users;
receiving a preliminary set of video commercials selected from an initial set of video commercials based on the identification of the plurality of users and the analysis of a plurality of social relationships between the users, wherein the preliminary set of video commercials are received from a cloud-based service, and wherein one or more services are associated with a television service provider;
determining a user satisfaction score for each video commercial from the preliminary set of video commercials based on attributes associated with the plurality of users, an audio device associated with monitoring and detecting speech recognition for a plurality of predetermined keywords, and features associated with each video commercial, wherein the attributes associated with the plurality of users includes a plurality of moods associated with the plurality of users based on facial recognition techniques of a plurality of facial contortions, wherein the attributes associated with a plurality of users is weighted based on the significance of one or more attributes to the plurality of users to optimize one or more predictions, wherein the plurality of features associated with the video commercial that resonate with a majority of the plurality of users are weighted more heavily;
determining an advertiser satisfaction score for each video commercial from the preliminary set of video commercials based on an expected revenue amount for each video commercial and the features associated with each video commercial;
determining a combined satisfaction score for each video commercial from the preliminary set of video commercials based on the user satisfaction score and the advertiser satisfaction score for each video commercial;

dynamically selecting a primary set of video commercials from the preliminary set of video commercials based on the combined satisfaction score, wherein the selected primary set of video commercials is a smaller set of the video commercials from the preliminary set of video commercials; and providing the primary set of video commercials.

19. A computer system for personalizing video commercials displayed on a user device, the computer system comprising:

at least one processing unit;

at least one computer readable memory;

at least one computer readable tangible, non-transitory storage medium; and program instructions stored on the at least one computer readable tangible, non-transitory storage medium for execution by the at least one processing unit via the at least one computer readable memory, wherein the program instructions comprise program instructions for:

determining an identification of a plurality of users by utilizing a user device to identify characteristics of the plurality of users based on facial recognition techniques and biometrics, wherein the determined identification of the plurality of users is continuously monitored and automatically modified, in real time, based on a change in the plurality of users;

receiving a preliminary set of video commercials selected from an initial set of video commercials based on the identification of the plurality of users and the analysis of a plurality of social relationships between the users, wherein the preliminary set of video commercials are received from a cloud-based service, and wherein one or more services are associated with a television service provider;

determining a user satisfaction score for each video commercial from the preliminary set of video commercials based on attributes associated with the plurality of users, an audio device associated with monitoring and detecting speech recognition for a plurality of predetermined keywords, and features associated with each video commercial, wherein the attributes associated with the plurality of users includes a plurality of moods associated with the plurality of users based on facial recognition techniques of a plurality of facial contortions, wherein the attributes associated with a plurality of users is weighted based on the significance of one or more attributes to the plurality of users to optimize one or more predictions, wherein the plurality of features associated with the video commercial that resonate with a majority of the plurality of users are weighted more heavily;

determining an advertiser satisfaction score for each video commercial from the preliminary set of video commercials based on an expected revenue amount for each video commercial and the features associated with each video commercial;

determining a combined satisfaction score for each video commercial from the preliminary set of video commercials based on the user satisfaction score and the advertiser satisfaction score for each video commercial;

dynamically selecting a primary set of video commercials from the preliminary set of video commercials based on the combined satisfaction score, wherein the selected primary set of video commercials is a smaller set of the video commercials from the preliminary set of video commercials; and providing the primary set of video commercials.

* * * * *